Dec. 21, 1943.  D. W. FENTRESS  2,337,038
FLEXIBLE CONNECTOR
Filed June 11, 1942
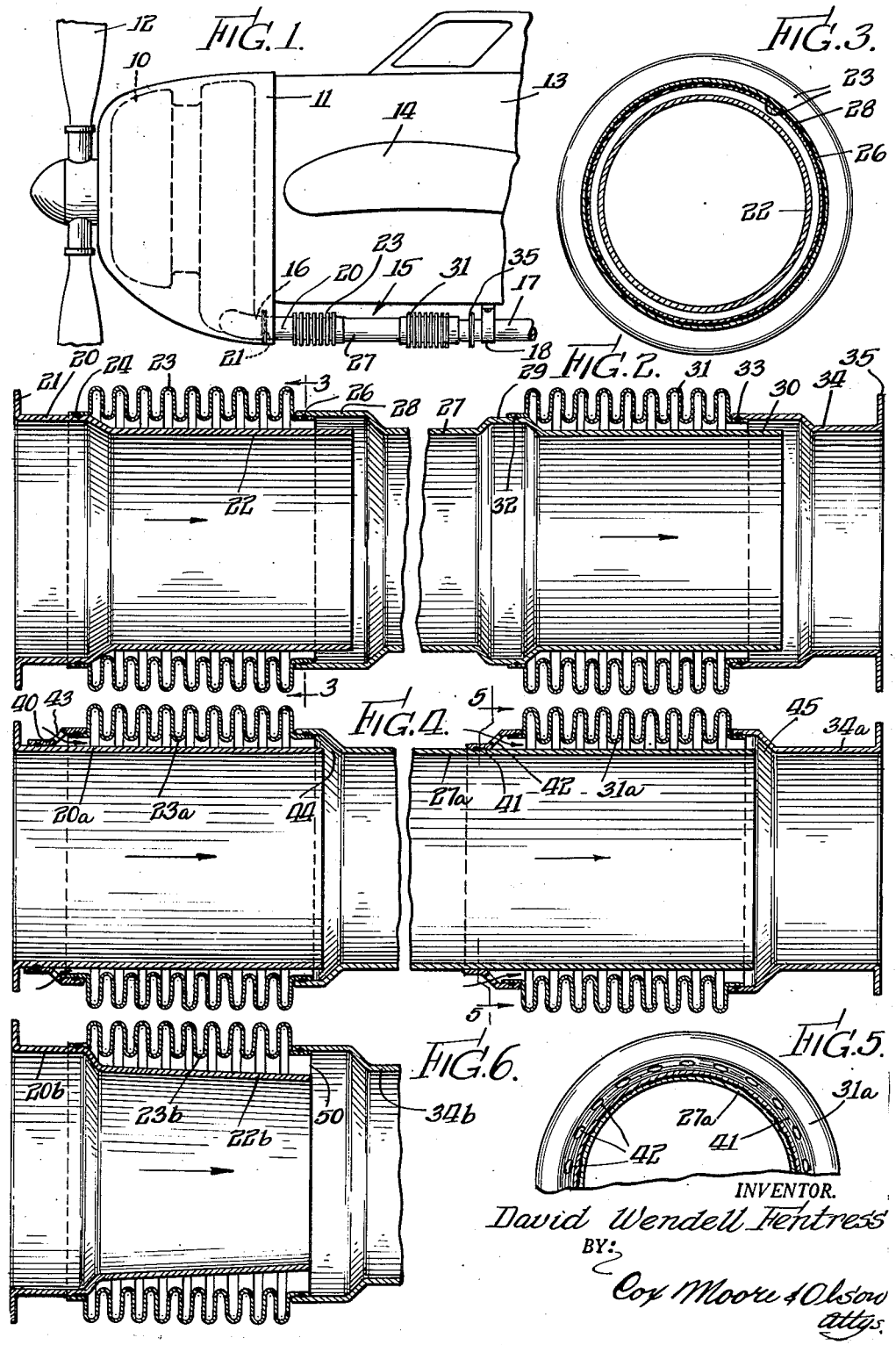
INVENTOR.
David Wendell Fentress
BY:
Cox Moore & Olson
attys.

Patented Dec. 21, 1943

2,337,038

UNITED STATES PATENT OFFICE 2,337,038

FLEXIBLE CONNECTOR

David Wendell Fentress, Barrington, Ill., assignor to Chicago Metal Hose Corporation, Maywood, Ill., a corporation of Illinois Application June 11, 1942, Serial No. 446,609

6 Claims. (Cl. 285—90)

This invention relates to flexible connectors or conduits, and more particularly to connectors or conduits adapted for the transmission of destructive gases or fluids, such for example as exhaust connections for internal combustion engines and the like.

It is an object of the invention to provide a flexible conduit, particularly adapted for the transmission of destructive fluids, of improved construction and durability.

More particularly stated, it is an object of the invention to provide a flexible conduit structure wherein the flexible portions thereof are shielded from the action of the conducted fluids.

Further objects of the invention are to provide a flexible conduit of the type defined which is fluid and gas-tight, which is not subjected to wear or deterioration by vibration, which is noiseless in operation, and which will be of maintained flexibility and extended life.

Still further objects of the invention are to provide a flexible conduit of the type defined which is light in weight, and which will absorb relative axial and offset shifting of the connected conduit parts, as well as bending movements.

Another object of the invention is to provide a flexible conduit connector in which there are no relatively sliding parts to jam or "freeze" or to become noisy or loose in operation.

Another object of the invention is to provide a conduit structure for the conducting of hot gases or fluids, which is self-cooling.

Another object of the invention is to provide an improved flexible exhaust pipe or conduit for internal combustion engines.

Various other objects, advantages and features of the invention will be apparent from the following specification when taken in connection with the accompanying drawing, wherein certain preferred embodiments of the invention are set forth for purposes of illustration.

In the drawing, wherein like reference numerals refer to like parts throughout:

Fig. 1 is a partial view of an aircraft, incorporating by way of illustration, a flexible exhaust conduit constructed in accordance with the principles of the invention;

Fig. 2 is a detail view in longitudinal section of the flexible connector or conduit illustrated in Fig. 1;

Fig. 3 is a transverse sectional view through the conduit, on the line 3—3 of Fig. 2;

Fig. 4 is a longitudinal sectional view of a conduit structure, similar to Fig. 2, but showing a modified embodiment;

Fig. 5 is a transverse sectional view through the conduit of Fig. 4 on the line 5—5 thereof; and Fig. 6 is a detail view, in longitudinal section, of a still further modified form of structure.

In the drawing the invention has been shown for purposes of illustration as applied to the exhaust pipe of an internal combustion engine for aircraft, as it is well adapted for a use of this character. It is to be understood, however, that the invention is equally adapted for use for other purposes and in other types of installations, including exhaust pipes for the internal combustion engines of other types of vehicles or structures.

Referring more particularly to the drawing, and first to the embodiment illustrated in Figs. 1, 2 and 3, the aircraft illustrated comprises an internal combustion engine 10 within a cowling 11, and a propeller 12, mounted on the forward end of a fuselage or body 13 provided with a wing structure 14. A flexible connector or exhaust conduit connection comprising the subject matter of the invention is generally indicated by the numeral 15. The flexible connector forms a part of the exhaust pipe connections for the internal combustion engine, and may be connected in any suitable manner to the exhaust pipe part 16 leading from and secured to the internal combustion engine, and the exhaust pipe part 17 leading to a suitable point of outlet or exhaust. The pipe part 17 is secured to the body 13 by means of a support bracket or the like 18.

In a structure such as illustrated the engine 10 is generally resiliently mounted with respect to the aircraft body structures, which fact, together with the forces and stresses applied to the engine in use, causes it to shift within predetermined limits relative to the body 13 during operation of the apparatus. The engine may rotate slightly on its central longitudinal axis, or it may shift bodily rearwardly or forwardly with respect to the body 13, or it may undergo other forms of shifting movement with respect to the body, within predetermined limits. In view of the fact that the exhaust pipe part 16 is rigid with the engine 10, whereas the exhaust pipe part 17 is rigidly secured to the body 13 by means of the bracket 18 or the like, relative shifting motion between the pipe parts 16 and 17 takes place during the shifting of the engine. The flexible connector 15 may thus be subjected to axial compression, bending, or offset lateral shifting movements wherein the pipe parts 16 and 17 shift laterally relative to each other but with their longitudinal axes maintained in parallel relationship. Additionally, the pipe members 16 and 17 may be subjected to intense vibration during the operation of the engine, both individually and relative to each other.

The flexible connector 15 provides means for absorbing all motions between the pipe parts 16 and 17, whether axial shifting, bending, offset shifting, or vibrational, or any of such movements in combination; while at the same time providing a fluid or gas-tight connection between the parts.

Referring more particularly to Fig. 2, the connector comprises a relatively rigid conduit or pipe portion 20 provided at one end with a flange 21 of any suitable character, by means of which the pipe 20 may be secured to the end pipe 16. The opposite end of the pipe or conduit 20 is formed with a reduced cylindrical portion 22. In accordance with the invention, a piece of flexible metal tubing 23 is secured at one end to the pipe 20 by means of a suitable fluid-tight connection, as indicated at 24. Such connection preferably comprises a circular seam resistance weld extending circumferentially or peripherally of the parts whereby the end of the flexible tubing is secured in a permanent fluid-tight connection to the pipe or conduit 20.

In the embodiment illustrated the flexible tubing 23 is preferably of annularly corrugated one piece construction, such for example as longitudinally seam welded, as such tubing is fluid-tight and well adapted for circular end securing, as indicated at 24. It is to be understood, however, that other types of flexible metal tubing may be employed.

The opposite end of the flexible tubing 23 is suitably secured, as by means of a circular weld 26 to the end of a relatively rigid conduit or pipe member 27 forming a central portion for the flexible connector structure. In the particular embodiment illustrated the end portion 28 of the pipe 27 is of increased diameter substantially commensurate with the larger diameter of the pipe 20, whereas the main body portion of the pipe 27 is of reduced diameter, substantially commensurate with the diameter of the cylindrical pipe portion 22. Pipe 27 is also provided with a portion 29 of increased diameter and an end portion 30, again of reduced diameter, substantially commensurate with that of the pipe portion 22.

A second flexible metal tubing 31, preferably of a type and kind similar to the tubing 23 is secured at one end to the pipe portion 29 by means of a fluid-tight circular connection as indicated at 32. The opposite end of the tubing 31 is similarly secured by means of a fluid-tight circular connection 33 to a relatively rigid end pipe member 34 having one portion thereof of reduced diameter substantially commensurate with the diameter of the pipe portions 22, 27 and 30, and a portion of increased diameter substantially commensurate with that of the pipe portions as indicated at 20, 28 and 29. The pipe member 34 is also provided with an end flange 35 by means of which it may be secured in any desired manner to the exhaust pipe part 17, Fig. 1.

In an illustrative embodiment, the pipe members 20, 27 and 34 may, for example, be of a wall thickness on the order of one-sixteenth of an inch, and formed of suitable exhaust pipe metal such, for example, as carbon steel or the like. On the other hand, the flexible tubings 23 and 31 are preferably relatively much thinner as to wall thickness. They may, for example, be on the order of .008 inch or less in wall thickness, and are preferably formed of stainless steel or like corrosive-resistant and relatively strong material.

In the operation of the structure, while the pipe members 20, 27 and 34 are individually relatively rigid, collectively the connector 15 provides a flexible structure, due to the interposition of the flexible tubings 23 and 31 as the connecting elements between the rigid pipe parts. In operation, the pipe parts 20 and 34 may shift axially toward and away from each other, or they may be bent so that their axes assume a non-parallel relationship, or they may be offset or shifted laterally with their axes maintained in parallel relationship, the thin-walled annularly corrugated bellows flexible tubings 23 and 31 readily flexing to accommodate such movements.

While the flexible tubings 23 and 31 thus constitute the flexible elements of the connector structure, it will be noted that during operation they are protected from the action of the exhaust gases by the pipe portions 22 and 30, respectively. More particularly, as the exhaust gases are projected through the conduit in the direction of the arrows in Fig. 2, they are prevented by the pipe portions 22 and 30 from contacting or impinging against the relatively frangible thin-walled tubings 23 and 31. The tubings 23 and 31 are thus permitted to impart flexibility to the structure, but without being subjected to the destructive characteristics of the transmitted gases or fluids. The relatively thicker pipe portions 22 and 30 act as baffles or linings for the flexible tubings, absorbing the heat and fluid impact, and thereby protecting the flexible thin-walled tubing structures.

It will further be noted that in the operation of the structure there are no contacting and relatively sliding connections. More particularly, the pipe portion 22 is maintained continuously in spaced relation from the flexible tubing 23 and the pipe 27, and the pipe portion 30 is similarly maintained continuously in spaced relation from the flexible tubing 31 and the pipe 34, during operation and during the flexing movement to which the structure is subjected in use, whereby to avoid wear and resulting deterioration between the parts even though the structure is subjected to extreme conditions of vibration. There are also no relatively shiftable sliding connections to become fouled with carbon, or pitted or scored whereby to lessen the flexibility of the structure. In accordance with the structure provided, the initial flexibility is maintained throughout the life of the connector. Also, there are no relatively sliding parts to jam or "freeze" or to become noisy or loose in operation. The fluid-tight connections 24, 26, 32 and 33, and the one piece character of the flexible tubings 23 and 31 insure positive gas or fluid-tightness, whereby to preclude seepage of fluids such as exhaust fumes from the conduit, which is particularly desirable when the conduit is used as an exhaust pipe and passes through confined passenger occupied compartments.

While in the construction as set forth in Figs. 2 and 3, the baffle portions 22 and 30 protect the convolutions of the flexible tubing from the direct heat contact of the exhaust gases, in certain instances it may be desirable to provide further means for cooling the walls of the flexible tubings, to insure prolonged life. Such a structure is illustrated in Figs. 4 and 5. In this instance the end of the flexible tubing 23a is secured to the pipe member 20a by means of a circular fitting 40, circumferentially secured to the end of the tubing 23a and to the pipe 20a as best shown in Fig. 4. Similarly, a fitting 41 serves as means for securing the end of the flexible tubing 31a to the pipe member 27a. As perhaps best shown in Fig. 5, the fitting 41 is provided circumferentially with a series of openings 42, the fitting 40 being similarly provided with openings 43, through which the relatively cool air of the atmosphere may be drawn during the operation of the structure. More particularly, a Venturi action is secured between the pipe 20a and the pipe 27a at the point indicated by the reference numeral 44, a similar Venturi action being provided between the end of the pipe 27a and the pipe 34a at the point indicated by the reference numeral 45, whereby air is drawn through the openings 43 and 42, respectively, as indicated by the arrows, during the operation of the structure. This relatively cool air from the atmosphere or other suitable source of supply passes along the base of the convolutions of the corrugated tubings effecting a cooling action thereon, which in combination with the fact that the hot exhaust gases are maintained out of direct contact with the flexible tubings, provides for the maintained cooling of the tubings and their resultingly prolonged life.

While the structure of Figs. 4 and 5 is not fluid or gas-tight, it will be noted that the arrangement is such that the exhaust gases do not escape through the openings 42 and 43 during operation of the structure. More particularly, air passes inwardly through these openings, but the conducted exhaust gases do not pass outwardly therethrough.

In Fig. 6 a still further modified embodiment of the invention is illustrated, in this instance but a single flexible tubing 23b being provided between the inlet pipe member 20b and the outlet pipe member 34b of the connector structure. In the structures of Figs. 2 to 5 inclusive there are two points, for example as indicated at 44 and 45 in Fig. 4, wherein relative movement between the pipe members 20, 27 and 34 may be absorbed. In Fig. 6 there is but a single motion absorbing space as indicated at 50. Accordingly, in this instance it may be desirable to provide the wall portion 22b of the pipe member 20b of somewhat conical shape whereby to increase the spacing between the parts at the point 50, thereby allowing for increased relative movement between the parts. Such conical shaping of the pipe portion 22b may also be utilized to advantage to secure a Venturi action, in the event cooling air openings are provided, as described in connection with the embodiment of the invention shown in Figs. 4 and 5.

It is obvious that various changes may be made in the specific embodiments of the invention set forth for purposes of illustration, without departing from the spirit thereof. For example, the pipe members 16 and 20 and the pipe members 34 and 17 could be formed of one piece, the connector parts thus forming an integral part of the complete exhaust line. Accordingly, the invention is not to be limited to the precise embodiments shown and described, but only as indicated in the following claims.

The invention is hereby claimed as follows:

1. A flexible conduit for the transmission of exhaust gases and the like, said conduit comprising a first relatively rigid section, a section of flexible convoluted metal tubing, and a second relatively rigid section disposed in longitudinal continuation, and wear resisting means disposed internally of the flexible tubing forming a baffle therefor, said wear resisting baffle being sealed at one end to said first rigid section in a fluid-tight joint and being disposed in spaced relation at its other end with respect to said second rigid section, whereby the flexible tubing acts as a flexible connecting means for the rigid sections and fluids conducted through the conduit in a direction of flow from the first rigid section to the flexible sections are maintained from flow contact with the convolutions of the flexible tubing.

2. A flexible conduit for the transmission of exhaust gases and the like, said conduit comprising a first relatively rigid section, a section of flexible convoluted metal tubing, and a second relatively rigid section disposed in longitudinal continuation, said flexible tubing having a wall thickness less than the wall thickness of said relatively rigid sections, and wear resisting means disposed internally of the flexible tubing forming a baffle therefor, said wear resisting baffle having a thickness and wear resistance characteristic substantially as great as the thickness and wear resistance characteristic of said rigid sections, and said wear resisting baffle being sealed at one end to said first rigid section in a fluid-tight joint and being disposed in spaced relation at its other end with respect to said second rigid section, whereby the flexible tubing acts as a flexible connecting means for the rigid sections and fluids conducted through the conduit in a direction of flow from the first rigid section to the flexible section are maintained from flow contact with the convolutions of the flexible tubing.

3. A flexible conduit for the transmission of exhaust gases and the like, said conduit comprising a first relatively rigid section, a section of flexible convoluted metal tubing, and a second relatively rigid section disposed in longituidnal continuation, said flexible tubing being provided with cylindrical end portions secured respectively to said relatively rigid sections by means of circumferentially extending welded joints, and wear resisting means disposed internally of the flexible tubing forming a baffle therefor, said wear resisting baffle being sealed at one end to said first rigid section in a fluid-tight joint and being disposed in spaced relation at its other end with respect to said second rigid section, whereby the flexble tubing acts as a flexible connecting means for the rigid sections and fluids conducted through the conduit in a direction of flow from the first rigid section to the flexible section are maintained from flow contact with the convolutions of the flexible tubing.

4. A flexible conduit for the transmission of exhaust gases and the like, said conduit comprising a first relatively rigid section, a section of flexible convoluted metal tubing, and a second relatively rigid section disposed in longitudinal continuation, and wear resisting means disposed internally of the flexible tubing forming a baffle therefor, said wear resisting baffle being formed as an integral extension of said first rigid section and being disposed at its free end in spaced relation with respect to said second rigid section, whereby the flexible tubing acts as a flexible connecting means for the rigid sections and fluids conducted through the conduit in a direction of flow from the first rigid section to the flexible section are maintained from flow contact with the convolutions of the flexible tubing.

5. A flexible conduit for the transmission of exhaust gases and the like, said conduit comprising a first relatively rigid section, a first section of flexible convoluted metal tubing, a second relatively rigid section, a second section of flexible convoluted metal tubing, and a third relatively rigid section disposed in longitudinal continuation, and wear resisting means disposed internally of both of said flexible tubings forming baffles therefor, the wear resisting baffle for the first flexible tubing being sealed at one end to said first rigid section in a fluid-tight joint and being disposed in spaced relation at its other end with respect to said second rigid section, and the wear resisting baffle for the second flexible tubing being sealed at one end to said second rigid section in a fluid-tight joint and being disposed in spaced relation at its other end with respect to said third rigid section, whereby the flexible tubings act as flexible connecting means for the rigid sections and fluids conducted through the conduit in a direction of flow from the first rigid section to the first flexible section are maintained from flow contact with the convolutions of the flexible tubings.

6. A flexible conduit for the transmission of exhaust gases and the like, said conduit comprising a first relatively rigid section, a section of flexible convoluted metal tubing, and a second relatively rigid section disposed in longitudinal continuation, and wear resisting means disposed internally of the flexible tubing forming a baffle therefor, said wear resisting baffle being sealed at one end to said first rigid section in a fluid-tight joint and being disposed in spaced relation at its other end with respect to said second rigid section, whereby the flexible tubing acts as a flexible connecting means for the rigid sections and fluids conducted through the conduit in a direction of flow from the first rigid section to the flexible section are maintained from flow contact with the convolutions of the flexible tubing, and means comprising a plurality of openings through the conduit at the inlet end of the flexible tubing for introducing cooling air into the conduit between the wear resisting baffle and the flexible convoluted tubing.

DAVID WENDELL FENTRESS.